United States Patent Office 3,004,032
Patented Oct. 10, 1961

3,004,032
PROCESS FOR PRODUCING A COBALT MERCAPTOBENZOTHIAZOLE COMPOUND
Lucien Péras, Billancourt, France, assignor to Regie Nationale des Usines Renault, Billancourt, France
No Drawing. Filed June 15, 1959, Ser. No. 820,099
Claims priority, application France July 7, 1958
1 Claim. (Cl. 260—299)

This invention relates to a novel organic cobalt compound and to its mode of preparation.

The novel organic compound constituting the subject-matter of this invention is a combination of mercaptobenzothiazole with cobalt.

A typical form of preparation of the novel organic cobalt compound consists in causing sodium salt of mercaptobenzothiazole to react with cobalt. A typical manner in which this compound can be prepared is described hereafter:

At room temperature, on the one hand 3 kilograms of mercaptobenzothiazole in powder form and on the other hand the stoichiometrical quantity (600 grams) of soda necessary to yield sodium mercaptobenzothiazolate

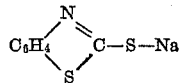

are poured into twenty litres of denatured alcohol, this soda being dissolved beforehand in 1.5 litres of pure water.

The two solutions or suspensions are mixed together and subsequently stirred until the dissolution has been completed.

Then 4,200 kilograms of hydrated cobalt chloride $CoCl_2, 6H_2O$ in a finely pulverized state are added. The mix is stirred until the cobalt chloride has disappeared. The green cobalt mercaptothiazolate precipitates. Then 20 litres of water are added and the mix is stirred again and subsequently filtered on a vacuum filter or a filter press. The liquid is put aside for recovering the excess alcohol and cobalt salt.

The "cobalt captate" cake is then dispersed in 50 litres of water. The mix is again filtered and dried; the same washing step is repeated two or three times.

Finally, the cobalt mercaptobenzothiazolate is dried by heating to 50° C.

When assayed the product prepared in the manner set forth hereinabove shows a 11% cobalt content.

As a result, the substance thus prepared may be represented by the formula:

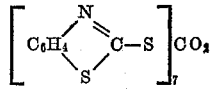

which differs considerably from what could be expected, since this final product was obtained from the initial divalent cobalt salt $CoCl_2, 6H_2O$, and sodium mercaptobenzothiazolate

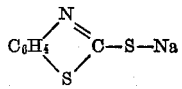

This novel cobalt derivative is therefore a compound. It has the appearance of a green powder insoluble in water, soluble in acetone, benzene, toluene and chloroform; all these solutions are green.

When examined in an absorptionmeter of the visible-light type, two transparence bands having their maxima at 4,000 A. and 6,100 A. respectively are observed.

This novel compound may be used in rubber mixtures as a vulcanisation accelerator.

I claim:

Process for obtaining a cobalt mercaptobenzothiazole having the formula

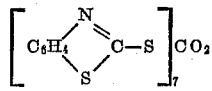

which comprises: producing a first solution by mixing without heating, about 76% by weight of denatured alcohol, about 14% by weight of mercaptobenzothiazole in powder form and about 10% by weight of an aqueous soda solution having a concentration of about 28.5%; agitating this mixture until the dissolution is complete; mixing a second composition constituted by about 83.6% of said first solution and about 16.4% of hydrated cobalt chloride $CoCl_2, 6H_2O$ in a finely pulverized state; agitating said second composition until reaction is complete and green cobalt mercaptobenzothiazolate precipitates, and separately recovering the cobalt mercaptobenzothiazolate.

References Cited in the file of this patent
UNITED STATES PATENTS
2,798,106    Hill et al. _____ July 2, 1957
OTHER REFERENCES
Spacu et al.: Chem. Abstracts, vol. 30 pp. 2872–3 (1936).
Miyama: Chem. Abstracts, vol. 44, col. 9718 (1950).

UNITED STATES PATENT OFFICE
CERTIFICATE OF CORRECTION

Patent No. 3,004,032            October 10, 1961

Lucien Péras

It is hereby certified that error appears in the above numbered patent requiring correction and that the said Letters Patent should read as corrected below.

Column 2, lines 1 to 4, the formula should appear as shown below instead of as in the patent:

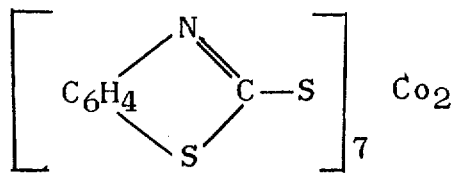

same column 2, lines 25 to 29, the formula should appear as shown below instead of as in the patent:

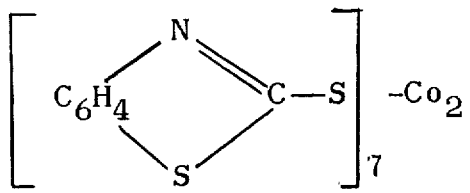

Signed and sealed this 14th day of May 1963.

(SEAL)
Attest:

ERNEST W. SWIDER            DAVID L. LADD

Attesting Officer            Commissioner of Patents